Figure 1:
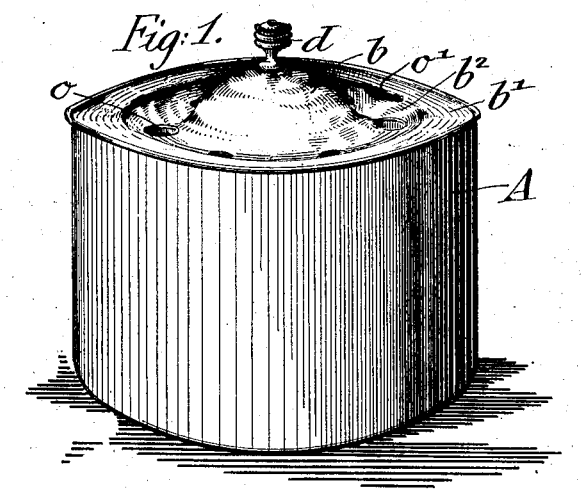

No. 761,498. PATENTED MAY 31, 1904.
O. & F. KAMPFE.
COVER FOR VESSELS.
APPLICATION FILED FEB. 11, 1904.
NO MODEL.

Witnesses
Henry J. Suhrker
Jacob H. Glercor

Inventors
Otto Kampfe and Frederick Kampfe
By their Attorneys

No. 761,498. Patented May 31, 1904.

UNITED STATES PATENT OFFICE.

OTTO KAMPFE AND FREDERICK KAMPFE, OF NEW YORK, N. Y.

COVER FOR VESSELS.

SPECIFICATION forming part of Letters Patent No. 761,498, dated May 31, 1904.

Application filed February 11, 1904. Serial No. 193,142. (No model.)

*To all whom it may concern:*

Be it known that we, OTTO KAMPFE and FREDERICK KAMPFE, citizens of the United States, residing in New York, borough of Brooklyn, and State of New York, have invented certain new and useful Improvements in Covers for Vessels, of which the following is a specification.

This invention relates to an improved cover for vessels, by means of which cover the boiling over of milk or other liquid and the annoyance caused thereby is effectively prevented.

In the application, Serial No. 162,235, which was filed by us on June 19, 1903, there was shown and described a cover for vessels which is provided with an annular concentric depression having perforations in its bottom, said perforations being covered by a ring-shaped valve, which normally closes the perforations and which is lifted up by the pressure in the interior of the vessel, said perforations serving for returning into the vessel the liquid that is forced through them into the annular depression, so as to prevent the liquid from flowing over and being spilled.

We have found by practical tests that we may construct an efficient cover for vessels that does not require the use therewith of a ring-shaped valve, such as is referred to as C in our prior application for a patent, Serial No. 162,235, and shown in the drawings therewith. This ring-shaped valve normally acts to close the perforations in the bottom of the depression in the cover shown in the drawings accompanying said prior application.

In the device shown in the drawings in the present application the ring-shaped valve is eliminated and a cover is shown having in addition to the perforations in the bottom of the depression slotted openings in the rim of the cover, which openings are located at a suitable height above the depression, so as to return the overflow as it rises through the perforations before the liquid is returned into the vessel, said slotted openings serving, furthermore, for relieving interior pressure caused by a skin forming on the surface of the liquid to be boiled, said openings permitting thereby a more uniform, even, and steady boiling of the liquid without any danger of overflow; and for this purpose the invention consists of a cover for vessels which is provided with a central raised or dome-shaped portion, an annular rim, and an annular depression between the dome-shaped portion and rim, said annular depression being provided with perforations at its lowest portion and with slots in the rim at points on a higher level than the bottom perforations, as will be fully described hereinafter and finally pointed out in the claims.

Figure 2:
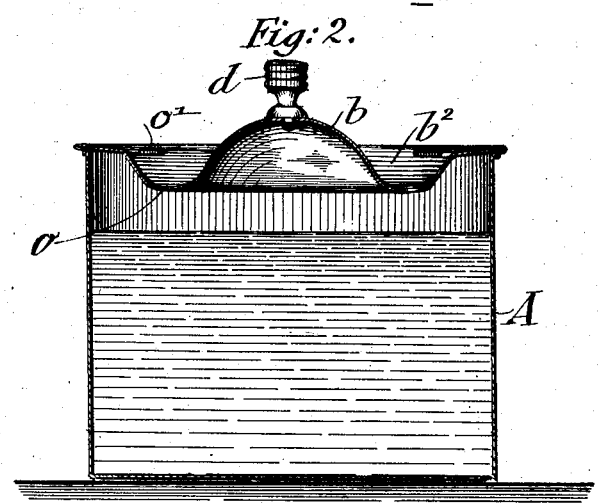
Figure 3:
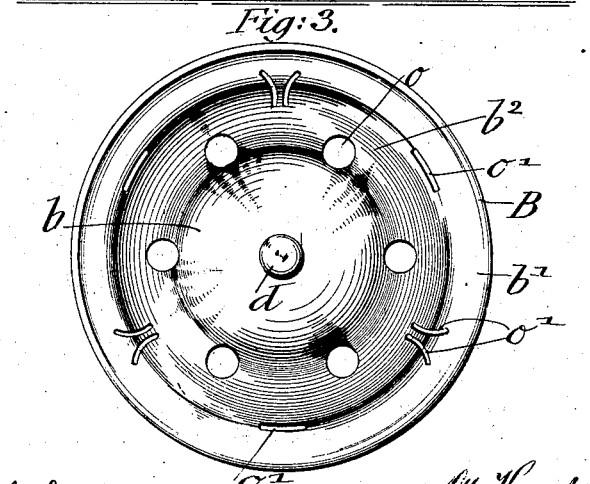

In the accompanying drawings, Figure 1 represents a perspective view of our improved cover for vessels, showing the same in position above the vessel. Fig. 2 is a vertical central section through the vessel and cover, and Fig. 3 is a top view of the cover.

Similar letters of reference indicate corresponding parts.

Referring to the drawings, A represents a vessel of suitable size and material, and B our improved cover for the same. The cover is provided with a central raised or dome-shaped portion $b$, to which a button $d$ is attached in the usual manner. The cover has an annular rim $b'$, which is preferably wired at its circumference and which has intermittently between the dome and rim an annular depression $b^2$. Perforations $o$ are arranged in the lowermost portion or bottom of the annular depression $b^2$, said perforations being preferably arranged equidistantly from each other, as shown in Fig. 3. Intermediately between the perforations $o$ in the annular depression $b^2$ of the cover are arranged in the rim at a higher level than said perforations a number of slotted openings $o'$, which may either be concentric with the center of the cover or approximately in V shape, as shown in Fig. 3, or in any other suitable form, provided that the lower ends of said slotted openings $o'$ of the rim are at a certain distance above the level of the perforations $o$ in the bottom of the depression. The slotted openings $o'$ in the rim $b'$ serve for two purposes—first, for preventing any pressure at the interior of the vessel, which pressure sometimes rises quickly, owing to the skin formed on the surface of the liquid, and which closes for a time the bottom perforations o, the vapor being then permitted to pass through the slotted openings o', so as to destroy the skin on the boiling liquid, and, secondly, for returning any liquid that is forced by the internal pressure through the bottom perforations first into the annular depression of the cover and then back into the vessel, so as to prevent the running over and spilling of the liquid. The slotted openings o' prevent, therefore, the sudden increase of pressure at the interior of the vessel above the atmospheric pressure, which would otherwise be caused by the ebullition of the boiling liquid, and return into the vessel any liquid that is raised through the bottom openings of the annular depression of the cover without causing it to run over the rim and be spilled. Our improved cover is therefore of special advantage for use with vessels in which milk and other liquids are boiled, inasmuch as the boiling over and disagreeable smell due to the burning of the liquid are thereby entirely prevented. Milk and other liquids may therefore be boiled without any danger of running over, owing to the arrangement of the perforations in the bottom of the depression and the additional openings in the rim of the cover.

Having thus described our invention, we claim as new and desire to secure by Letters Patent—

1. A cover for vessels, consisting of a central raised or dome-shaped portion, a rim concentric therewith, an annular depression between the dome and rim provided with perforations in the lower portion or bottom of the depression, and slotted openings located in said rim at a level above the bottom perforations in the depression, substantially as set forth.

2. A cover for vessels, consisting of a central raised or dome-shaped portion, a rim concentric therewith, an annular depression between said dome and rim provided with perforations in its lower portion or bottom, and slotted openings located intermediately between the bottom perforations in the depression but at a higher level than the same, substantially as set forth.

In testimony that we claim the foregoing as our invention we have signed our names in presence of two subscribing witnesses.

OTTO KAMPFE.
FREDERICK KAMPFE.

Witnesses:
PAUL GOEPEL,
HENRY J. SUHRBIER.